(12) United States Patent
Tilton et al.

(10) Patent No.: US 7,998,397 B2
(45) Date of Patent: Aug. 16, 2011

(54) DUAL CONSTITUENT CONTAINER AND FABRICATION PROCESS

(75) Inventors: Gregory J. Tilton, Waterville, OH (US); Martin T. Geithmann, Maumee, OH (US); Tom J. Carros, Holland, OH (US); Scott W. Steele, Perrysburg, OH (US)

(73) Assignee: Emergent Technologies, LLC, Chanhassen, MN (US)

( * ) Notice: Subject to any disclaimer, the term of this patent is extended or adjusted under 35 U.S.C. 154(b) by 390 days.

(21) Appl. No.: 12/121,184

(22) Filed: May 15, 2008

(65) Prior Publication Data

US 2008/0283533 A1  Nov. 20, 2008

Related U.S. Application Data

(60) Provisional application No. 60/938,373, filed on May 16, 2007.

(51) Int. Cl.
*B29C 49/00* (2006.01)
*B29C 49/70* (2006.01)

(52) U.S. Cl. ........ 264/531; 264/513; 264/523; 264/535; 264/537

(58) Field of Classification Search .................. 264/524, 264/531

See application file for complete search history.

(56) References Cited

U.S. PATENT DOCUMENTS

| | | | |
|---|---|---|---|
| 1,709,168 A | 4/1929 | Epperson | |
| 1,993,978 A | 3/1935 | Plochman | |
| 2,013,475 A | 9/1935 | Orton | |
| 2,075,137 A | 3/1937 | Rosen | |
| 2,424,536 A | 7/1947 | Mayer et al. | |
| 2,493,922 A | 1/1950 | Miller | |
| 2,766,796 A | 10/1958 | Tupper | |
| 3,290,728 A | 12/1966 | Pratt | |
| 3,304,354 A * | 2/1967 | Hill, Jr. et al. | ................ 264/540 |
| 3,316,594 A | 5/1967 | Hoffer et al. | |
| 3,364,521 A | 1/1968 | Valyi | |
| 3,377,773 A | 4/1968 | Clark | |

(Continued)

FOREIGN PATENT DOCUMENTS

CA  1031738  5/1978

(Continued)

OTHER PUBLICATIONS

"International Search Report from International application No. PCT/US2008/063702", Nov. 3, 2008.

(Continued)

*Primary Examiner* — Monica A Huson
(74) *Attorney, Agent, or Firm* — Pauly, DeVries Smith & Deffner, L.L.C.

(57) ABSTRACT

A dual constituent container includes a compartment for liquids and an elongate inwardly directed recess open to the container exterior and isolated from the compartment. The container is formed by blow molding, using a mold that incorporates a shaping feature projected longitudinally into the mold cavity. The shaping feature incorporates an arrangement of longitudinal channels having a channel width such that when a thermoplastic preform is expanded into contact with the mold cavity walls and the shaping feature, portions of the expanded preform span the channels and cooperate with the channels to provide passages that accommodate pressurized air to facilitate separation of the expanded preform from the shaping feature. The same portions of the expanded preform can partially protrude into the channels, thus to form longitudinal ribs along the recess which aid in frictionally holding a secondary constituent.

13 Claims, 5 Drawing Sheets

U.S. PATENT DOCUMENTS

| | | |
|---|---|---|
| 3,399,762 A | 9/1968 | Potter |
| 3,507,942 A | 4/1970 | Lynch |
| 3,590,989 A | 7/1971 | Wittwer |
| 3,732,999 A | 5/1973 | Rounkles |
| 3,741,383 A | 6/1973 | Wittwer |
| 3,898,029 A | 8/1975 | Krueger et al. |
| 4,021,519 A | 5/1977 | Krueger et al. |
| 4,206,171 A | 6/1980 | Uhlig |
| 4,235,343 A | 11/1980 | Thompson |
| 4,364,895 A | 12/1982 | Underwood |
| 4,392,576 A | 7/1983 | Berger et al. |
| 4,410,085 A | 10/1983 | Beneziat |
| 4,651,890 A | 3/1987 | Coker et al. |
| 4,948,641 A | 8/1990 | Shantz et al. |
| 5,044,173 A | 9/1991 | Cheng |
| 5,064,073 A | 11/1991 | Folland |
| 5,065,875 A | 11/1991 | Balavich |
| 5,189,892 A | 3/1993 | Roberts |
| 5,211,299 A | 5/1993 | Manfredonia |
| 5,316,398 A | 5/1994 | Chandaria et al. |
| 5,415,282 A | 5/1995 | Kienholz |
| 5,460,264 A | 10/1995 | Rupert |
| 5,467,877 A | 11/1995 | Smith |
| 5,664,671 A | 9/1997 | Nedblake, Jr. |
| 5,782,358 A | 7/1998 | Walker |
| 5,881,868 A | 3/1999 | Soyak et al. |
| 5,902,526 A * | 5/1999 | Davis et al. .................. 264/40.1 |
| 5,971,195 A | 10/1999 | Reidinger et al. |
| 5,992,677 A | 11/1999 | Ebine |
| 6,005,204 A | 12/1999 | Choi et al. |
| D436,852 S | 1/2001 | Chan |
| 6,293,435 B1 | 9/2001 | Forsberg |
| 6,672,817 B2 | 1/2004 | Denny |
| 6,989,168 B2 | 1/2006 | Fahey |
| 2002/0040883 A1 | 4/2002 | Ciesla |

FOREIGN PATENT DOCUMENTS

| | | |
|---|---|---|
| EP | 1514667 | 3/2008 |
| GB | 2297306 | 7/1996 |
| WO | WO-97/19802 | 6/1997 |
| WO | WO-2007016959 | 2/2007 |
| WO | WO-2008025301 | 3/2008 |

OTHER PUBLICATIONS

European Communication Pursuant to Article 94(3) EPC for co-pending European Patent Application No. 08 755 535.5-2308, mailed Aug. 18, 2010 (3 pages).

* cited by examiner

DUAL CONSTITUENT CONTAINER AND FABRICATION PROCESS

CROSS-REFERENCE TO RELATED APPLICATION

This application claims the benefit of priority of Provisional Application No. 60/938,373 entitled "Container Fabrication Process," filed May 16, 2007, which is hereby incorporated herein by reference.

BACKGROUND OF THE INVENTION

This invention relates to containers that incorporate separate compartments for different constituents, products, or elements, and more particularly to a blow molding process for fabricating such containers, and containers formed by the process.

As shown in U.S. Pat. No. 6,989,168 (Fahey), hereby incorporated herein by reference, a beverage container can be formed with a substantially centered upright cylindrical wall to divide the container into a primary compartment for the beverage, and an interior compartment open to the container bottom for containing a secondary food product, for example a package of cookies, food, a food bar, medicine, tablets, water purification tablets, crackers, or other products. To provide a more secure hold on the secondary product, the cylindrical wall forming the recess is stepped near the interior end of the recess, as perhaps best seen in FIGS. 2 and 6 of the patent. While this is considered to be an effective approach to providing the desired frictional engagement with the secondary product, it can be difficult to form the interior cavity when using a blow molding process to fabricate the containers.

Another processing difficulty, occasioned by the inward extension of the secondary compartment (i.e. upward in an upright container), is the tendency of the blow molding step to create a partial vacuum that holds the expanded thermoplastic firmly against the molding feature used to form the secondary compartment. This can prevent withdrawal of the molding feature, and thus prevent removal of the bottle from the mold.

An alternative approach for blow molding the containers was considered, namely to introduce a slight taper or incline in the recess to gradually reduce its diameter in the upward or inward direction. Then, the reduced-diameter region near the interior of the recess would provide the desired frictional fit. A sufficient degree of incline along the surfaces of the molding feature and the resulting compartment would have the additional advantage of facilitating removal of the expanded container from the mold after blow molding.

While workable, this approach created a conflict between two objectives: a secure frictional hold on the secondary product, aided by an axial or near-axial orientation of the secondary compartment wall; and enhancing the blow mold process, facilitated by providing a tapered secondary compartment wall.

SUMMARY OF THE INVENTION

A first aspect of the invention is a dual constituent container having a container wall shaped to provide a compartment for containing a first constituent. The container wall includes a bottom section and an outer wall section extending generally upwardly from the bottom section to determine an outer periphery of the container. The container wall further includes an inner wall section spaced apart radially inwardly from the outer wall section and extending upwardly from the bottom section to define a cylindrical recess elongate in a longitudinal direction and open at a bottom thereof to an exterior of the container. The container wall further includes an interior-end wall section disposed at a top of the inner wall section and cooperating with the inner wall section to isolate the compartment from the recess. An arrangement of elongate ribs is disposed axially along an inside surface of the inner wall section, and projects radially inward from the inside surface extending along at least a portion of a longitudinal length of the inner wall section. The first ribs are adapted to exert a radially inward force upon a second constituent removably inserted into the recess, thus to frictionally engage the second constituent while allowing the second constituent to slide longitudinally relative to the inner wall section.

Another aspect of the invention is a process for forming a container with a compartment and inwardly projecting recess isolated from the compartment, including the following steps: (a) providing a plurality of mold sections including a selected mold section with an elongate recess shaping feature; (b) assembling the mold sections into a mold in which the recess shaping feature projects longitudinally into a mold cavity of the mold, wherein the recess shaping feature has a smooth outer surface and includes at least one channel along the outer surface, the channel having a predetermined channel width and being recessed inwardly from the outer surface to an inner surface of the channel by at least a predetermined channel depth; (c) mounting a thermoplastic preform to the mold such that an expandable part of the preform projects into the mold cavity; (d) with the preform so mounted and with the expandable part heated to a processing temperature above a glass transition temperature of the preform, introducing a fluid under pressure into the preform to cause the expandable part of the preform to undergo a plastic expansion into surface contact with a cavity wall of the mold cavity and with the outer surface of the recess shaping feature to form an expanded container structure; (e) cooling the container structure to a temperature below the glass transition temperature to solidify the container structure; (f) after cooling the container structure, supplying a fluid under pressure via the at least one channel to an interface between the container and the shaping feature while simultaneously moving the selected mold section longitudinally relative to the container structure to separate the shaping feature from the container structure; and (g) removing the container structure from the mold cavity.

A further aspect of the invention is a system for molding a container with a compartment and a cylindrical recess separate from the compartment. The system includes first and second opposing mold sections having respective first and second confronting surface regions and respective first and second cavity-forming walls each recessed from its associated surface region. The opposing mold sections are adapted to be mounted in confronting relation for lateral movement between an open position in which the first and second mold sections are laterally spaced apart and a closed position to form a mold in which the first and second confronting surface regions are contiguous and the first and second cavity-forming walls cooperate to form a mold cavity. A third mold section includes an elongate shaping feature with an axially extending outer wall, supported for longitudinal movement relative to the first and second mold sections between: (1) an advanced position, in which the shaping feature extends longitudinally into the mold cavity; and (2) a retracted position, in which the shaping feature is spaced apart from the first and second mold sections. A support structure is adapted to support a thermoplastic preform with an elongate expandable part of the preform extending longitudinally into the mold cavity when the first and second mold sections are in the closed position. A first fluid conduit is adapted to conduct a fluid under pressure into the preform to cause the expandable part of the preform, when heated to a processing temperature above the glass transition temperature, to undergo a plastic expansion into contact with the cavity-forming walls and the outer surface of the shaping member to form an expanded container structure. The third mold section incorporates a fluid passage for conducting a fluid under pressure from outside the mold to an interface between the outer wall of the shaping feature and the expanded structure. The fluid passage includes a plurality of channels formed along the outer wall of the shaping feature and recessed inwardly by a predetermined channel depth. A second fluid source is adapted to supply a fluid under pressure to the interface via the passage simultaneously with a longitudinal retraction of the third mold section from the advanced position, to facilitate separation of the shaping feature from the container structure.

To achieve the foregoing objects, the shaping feature used to form the internal compartment is provided with a series of channels or vents that extend in the axial direction. In one particular embodiment, the channels extend over substantially the complete length of the shaping feature, are spaced apart angularly from one another and distributed substantially symmetrically about the shaping feature. In one embodiment, the channels are substantially uniform in transverse profile, i.e., in profiles taken in planes perpendicular to the axial direction.

The channels are selectively sized, particularly in terms of their transverse profiles to perform several useful functions during the molding process. First, the channels provide passages for air between the mold cavity wall and the thermoplastic preform to escape from the mold cavity as the preform is expanded toward contact with the mold cavity wall. Second, the channels provide air passages between the expanded container and the cavity wall. This is accomplished by forming the channels with a radial depth sufficiently large to promote airflow, and an angular or circumferential width sufficiently narrow to prevent the expanding thermoplastic material from completely entering or "filling" the channels. In one embodiment, the channels remain open to receive air under pressure from outside the mold cavity, and to separate the expanded preform from the shaping feature used to shape the interior compartment. This enables retraction of the shaping feature from the container, and thereby enables removal of the container from the mold.

In one example, the channel width, while sufficiently narrow to prevent the expanding thermoplastic from completely entering the channel as just noted, also is sufficiently large to allow a degree of thermoplastic penetration into the channel. In particular, the thermoplastic tends to form a smooth, rounded protrusion directed radially into the channel, substantially uniform in cross-section or profile taken transversely of the channel length. These protrusions form ridges or ribs that run axially along the wall section forming the interior compartment and extend radially a slight distance (e.g. several thousandths of an inch) into the interior of the compartment. The ribs cooperate to provide axially-extending, angularly-spaced-apart regions of concentrated frictional holding force between a secondary constituent in the compartment and the cylindrical compartment wall section surrounding the constituent.

Thus in accordance with the invention, a molding feature used to form an internal compartment in a container is provided with channels that facilitate the blow molding process by enabling convenient removal of the expanded container from the shaping feature after the blow molding step. The channels further form axially directed ribs along the secondary compartment interior for an improved frictional hold on the secondary constituent.

DETAILED DESCRIPTION OF THE PREFERRED EMBODIMENTS

Figure 1:
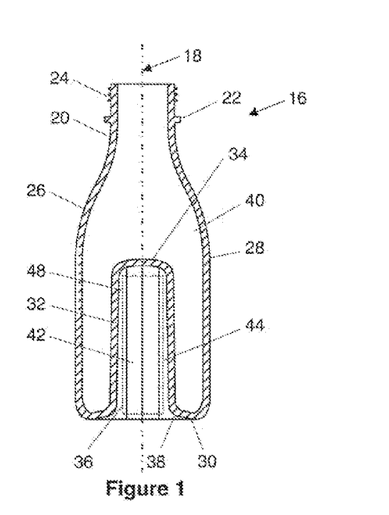
FIG. 1 is a sectional view of a bottle fabricated in accordance with the invention.
Figure 2:
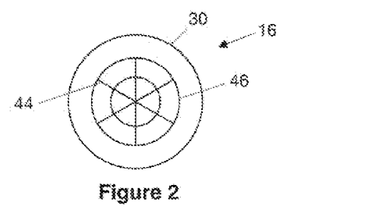
FIG. 2 is a bottom view of the bottle.

FIGS. 1 and 2 illustrate a dual compartment beverage container 16 in the form of a bottle symmetrical about a vertical axis 18. Over the lower portion of its length, container 16 has a vertical outside profile, followed by an upward and inward taper to a neck 20. The neck includes an annular rim 22 and threads 24 used to secure a cap to the bottle.

Container 16 is formed of a single continuous container wall 26 including an outside wall section 28 that determines the container profile, an annular bottom wall section 30, a substantially vertical and cylindrical inside wall section 32, and an upper or inner end section 34. The bottom wall section is toroidal, or a section of a toroid, in one embodiment. The term toroidal and toroid refers to a surface generated by the revolution of a closed plane contour about an axis lying in its plane. For the bottom wall section, the closed plane contour can be a circle, but more likely is a different type of contour having a flattened portion corresponding to the bottommost surface of the bottle.

The inside wall section and the end section cooperate to define a recess or elongate recess 36 open to an exterior of the container through an access aperture 38. Thus, the container forms two compartments: a compartment 40 for containing a beverage which can be considered the "primary" constituent, and a compartment 42 corresponding to recess 36 for containing a secondary constituent, typically cookies or another secondary food product. Examples of the secondary constituent are food, a food bar, medicine, tablets, water purification tablets, and crackers. Container 16 is formed of a material that is capable of stretch blow molding. For example, container 16 is formed of a polymeric material, e.g. a thermoplastic such as polyester, polyethylene, polyethylene terepthalate (PET), high density polyethylene, polyethylene naphthalate, polylactic acid (PLA), or polypropylene.

Six elongate ridges or ribs 44 run axially (i.e. vertically) along an interior surface of inside wall section 32, then extend generally radially inward along end section 34 to converge at the center of the end section. Near the bottom of container 16, lower end regions of ribs 44 extend radially outwardly to a circular, annular rib or ridge 46 formed along bottom section 30. Upper end regions of the ribs extend radially inwardly along end section 34. In other embodiments, different numbers of ribs 44 are provided, such as any number of ribs in the ranges one to five or seven to ten ribs.

The term elongate is intended to mean that the overall structure of each rib is long in the axial direction compared to its width in a radial direction. In one embodiment, the ribs 44 extend axially over the entire length of the recess. In another embodiment, the ribs extend over only a portion of the recess. In one embodiment, one or more ribs are made up of a series of protrusions in an axial arrangement, so that the overall structure of the series of protrusions is elongate.

A secondary constituent, e.g. a cartridge indicated in broken lines at 48, is removably maintained in compartment 42 at least partially by friction. More particularly, the cartridge typically is formed of a compliant polymeric thin film or sheet material such as cellophane or metalized polypropylene, wrapped in close surrounding relation about the accessory constituent. The cartridge is compliant and tends to conform to the shape of the cookies or other constituent. This provides a degree of flexibility and enhances the frictional hold on the cartridge. Ribs 44, by virtue of their extension away from inside wall section 32 radially toward the center of the recess, provide six substantially linear regions of contact between the cartridge and the inside wall section. Although other regions of the cartridge and of the inside wall section can be contiguous, the linear contact regions tend to concentrate the radial forces that the cartridge and inside wall section exert on one another. In the embodiment shown, the distance by which the ribs project radially inward is substantially uniform over the inside wall section, although in at least one embodiment, ribs can project radially inward at varying distances over the inside wall section. For example, in one embodiment the wall of the recess is a truncated conical section, and the ribs extend farther from the wall at the bottom region than at the top of the recess. As a result, a more uniform hold on the secondary constituent is possible.

The container 16 has a circular cross-section in the embodiment of FIG. 1. However, it is also possible for the container to have an oval cross-section or a square cross-section with rounded corners.

The recess 36 is a substantially cylindrical recess in one embodiment. By cylindrical, it is meant herein that for every point of the surface there is a straight line that lies on the surface, and the surface is spanned by a one-parameter family of parallel lines. According to this definition, the cylindrical recess is a circular cylindrical recess in one particular embodiment and an elliptic or oval cylinder in other particular embodiments. It is also possible for the recess to have a square cross-section with rounded corners.

In some embodiments, the recess is a truncated conical section, where the surface of the cone forms an angle of 0.5 degrees to 5 degrees to a vertical line. In one embodiment, the angle of the surface is 1 degree from vertical.

In various embodiments, the diameter of the recess 36 near its opening is at least 1 cm and not more than 5 cm. In one embodiment, the diameter of the recess 36 near its opening is 3 cm. In various embodiments, the diameter of the recess 36 near its top is at least 0.5 cm and not more than 5 cm. In one embodiment, the diameter of the recess 36 near its top is 2.3 cm. The height of the recess 36 is at least 3 cm and not more than 10 cm, or 7 cm in various embodiments. The height of the container 16 is at least 10 cm and not more than 30 cm, or 18 cm in various embodiments. In some embodiments, the ratio of the inner cavity or recess diameter to the container diameter is at least 25% and not more than 50%, while in one embodiment it is 35%. In some embodiments, the ratio of the inner cavity height to the container height is at least 10% and not more than 60%, or at least 35% and not more than 55%, or 40%.

As compared to the stepped compartment interior surface shown in the aforementioned 6,989,168 patent, inside wall section 32 through its substantially vertical orientation affords the advantage of maintaining a frictional hold of the cartridge over substantially the entire length of the cartridge. As compared to a cylindrical inside surface that is smooth, i.e. without ribs 44, inside wall section 32 provides a superior frictional hold of the cartridge. This is due to the relatively higher radial force levels along the linear contact regions, and also due to an improved capacity to accommodate irregularities in cartridge 48, as well as any variance among the different cartridges. It is also possible for container recess and rib structure to be configured to concentrate the hold on the leading edge of the cartridge 48.

In some embodiments, the diameter of the recess 36 narrows toward the top of the recess, either due to a stepped configuration with discrete sections having different diameters or inclined walls.

Figure 3:
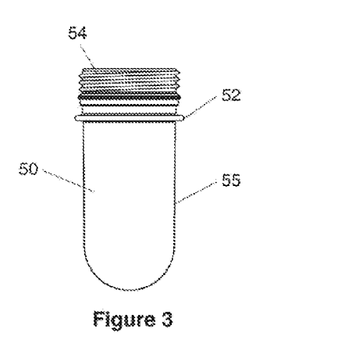
FIG. 3 is an elevation of a thermoplastic preform used to fabricate the bottle.

Container 16 is formed preferably by a blow molding process in which a parison or preform 50 (see FIG. 3) is heated, then expanded through high pressure gas into contact and conformity with a mold cavity. Preform 50 resembles a test tube, with a support ledge 52 and threads 54 near its top, corresponding to rim 22 and threads 24 of container 16 as shown in FIG. 1. The preform body 55 is the portion of the preform 50 below the support ledge 52 in the orientation of FIG. 3. The preform body 55 is the expandable part of the preform that is heated.

Figure 4:
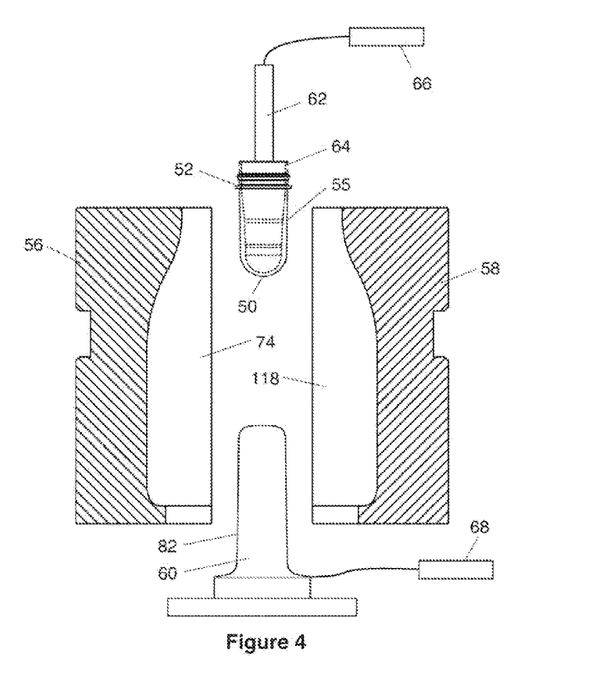
FIG. 4 is a schematic view of a system for fabricating the bottle.

FIG. 4 schematically shows a system for forming containers such as container 16 from preforms like preform 50. At the heart of the system is a container cavity mold consisting of three separate mold sections: a first cavity mold section 56; a second cavity mold section 58, opposing and confronting mold section 56; and a base mold section 60. Opposing sections 56 and 58 are supported for horizontal reciprocal motion to alternatively open and close the mold. Base section 60 is supported for vertical reciprocal motion relative to mold sections 56 and 58, between a raised or advanced position (in which the base section protrudes into the cavity formed by mold sections 56 and 58), and a lowered or retracted position.

A blow nozzle 62 includes a gripping device 64 for picking up the heated preform and placing it in position with respect to the mold cavities. The blow nozzle is movable to position the preform for fixation between mold sections 56 and 58 to extend in a downward direction into the cavity when the mold is closed. For a stretch blow molding process, blow nozzle 62 incorporates a vertically reciprocal stretch rod 65 which is not illustrated in FIG. 4.

A source 66 of pressurized air is fluid connected to blow nozzle 62, and is operable to provide pressurized air through a passage in the blow nozzle to expand or inflate preform 50. A source 68 of pressurized air is fluid coupled to base section 60, and is operable to supply air under pressure to the cavity when the mold is closed and when the base section is in the raised position. The pressurized air is released from the nozzle surrounding the stretch rod 65.

Figure 5:
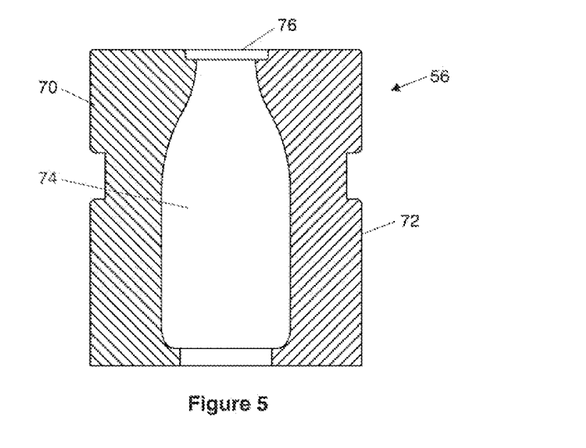
FIG. 5 is a more detailed elevation showing one of two opposing mold sections of the system.

With reference to FIG. 5, mold section 56 includes a main body 70 formed of any material known in the art such as, for example, aluminum or steel. An interior surface of the body, i.e. the surface that confronts opposing mold section 56, has a substantially planar region 72 and a rounded cavity region 74 shaped to define the outer profile of container 16, specifically the radially outward portion of bottom wall section 30 and outside wall section 28 except for the top of the container including threads 24 and rim 22 (see FIG. 1.) A circular recess 76 at the top of mold section 56 accommodates support ledge 52 of preform 50 to center the preform relative to the mold cavity (See FIG. 4.)

Figure 9:
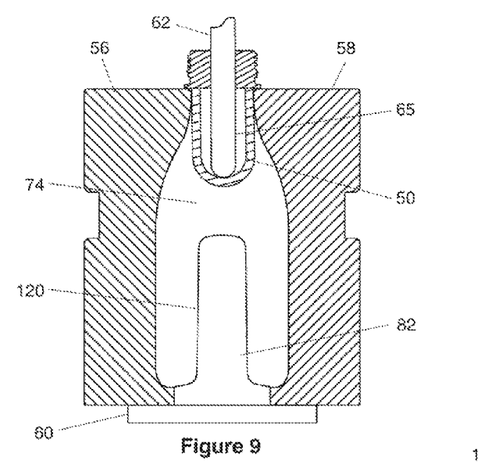
FIGS. 9-13 illustrate stages of the molding process.
Figure 10:
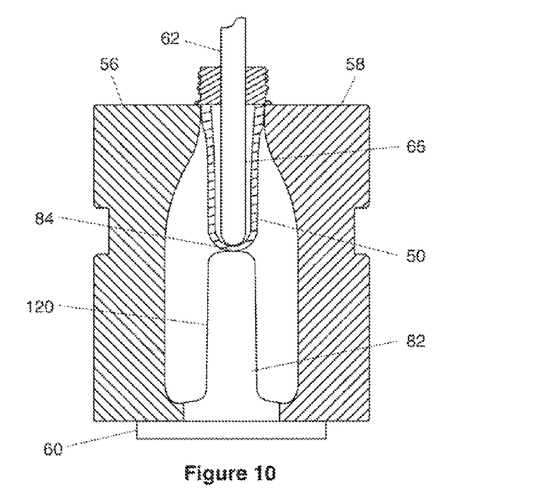
Figure 11:
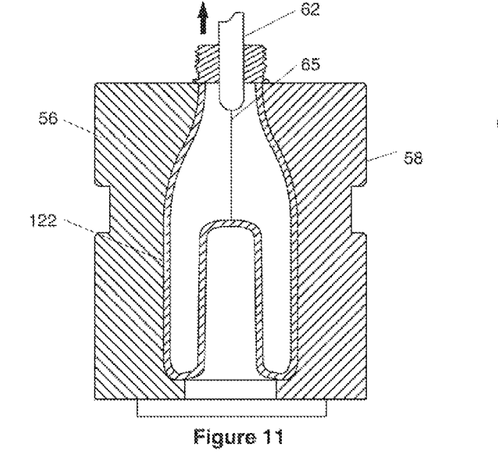

The mold sections 56 and 58 close around the preform 50 and the gripping device is released, so that the support ledge 52 rests on the circular recess 76. FIG. 5 illustrates the circular recess 76 with exaggerated dimensions so that it is visible in the Figure. FIGS. 4 and 9-11 do not illustrate the circular recess. It is also possible for the support ledge 52 to simply rest on the top surface of mold sections 56 and 58, as illustrated in FIGS. 9-11. However, the circular recess provides the function of centering the preform body within the mold cavity.

Corresponding planar and cavity surface regions of opposing mold section 58 are substantially identical, so that when these sections are brought together to close the mold, the respective planar surfaces are contiguous and the respective cavity surfaces cooperate to provide a cylindrical, continuous cavity surface. Further, mold sections 56 and 58 when closed provide a top opening for the top of the preform 50, and a bottom opening to receive base section 60 into the cavity, as shown in FIG. 4. After the bottom opening receives the base section 60, the base section locks into place.

Figure 6:
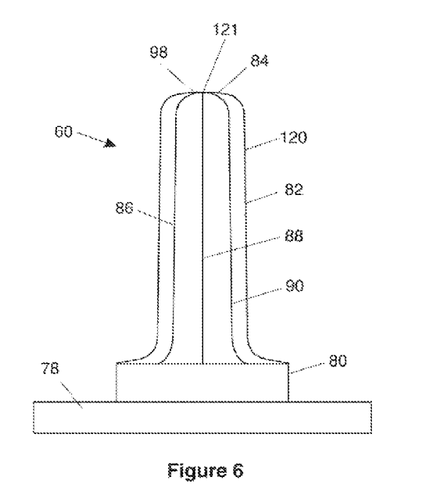
FIG. 6 is an elevation of a base mold section of the system.
Figure 7:
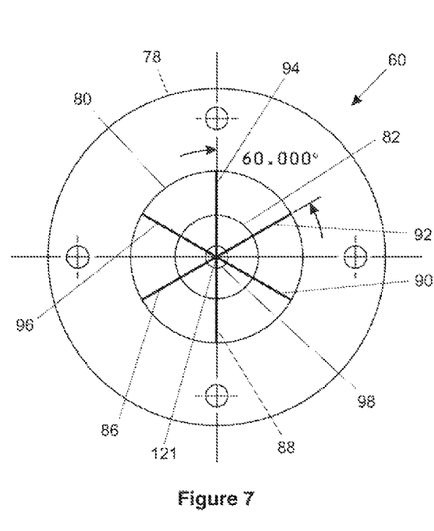
FIG. 7 is a top plan view of the base section.

As seen in FIGS. 6 and 7, base section 60 includes a platform 78, a pedestal 80 immediately above the platform, and an elongate recess shaping feature 82 extending upwardly from the pedestal. At the top, the shaping feature is rounded to provide an upper surface 84, which at its center is substantially horizontal.

Base section 60 includes a series of channels or vents, three of which appear in FIG. 6 at 86, 88 and 90. The remaining channels are shown in FIG. 7 at 92, 94 and 96. Each channel runs radially along pedestal 80 beginning at its outer edge, proceeds axially or vertically along feature 82, then extends radially inward along upper surface 84, to a point where the channels converge. A shallow recess 98 is formed at the top of the shaping feature, centered on the point of channel convergence. Channels 86-96 are equally angularly spaced apart from one another, symmetrically arranged about the base section.

Figure 8:
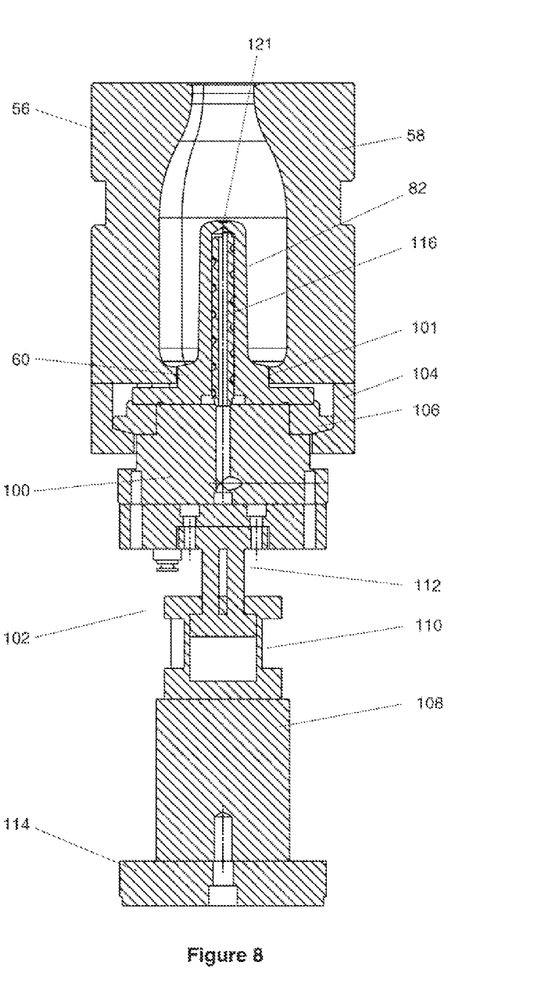
FIG. 8 is a partially sectioned elevation showing the base section advanced into a cavity formed by the opposing mold sections.

The complete blow molding cavity is formed by advancing base section 60 upwardly into the space between opposing mold sections 56 and 58 when these sections are closed, an arrangement illustrated in FIG. 8. An annular gap 101 between the base section and the other mold sections is in fluid communication with channels 86-96. The presence of the annular gap 101 causes formation of an annular rib 46, in some embodiments. The base section is removably fixed to an upper section 100 of a support device 102, through an arrangement of locking rings 104 and 106. Upper section 100 and a medial section 108 of the support device are coupled through a cylinder 110 and piston 112 operable to reciprocate the upper section relative to the medial section and a bottom section 114 of the support device.

An elongate insert 116 is contained within a central recess formed axially along base section 60. The insert is shaped to provide a passage with helical and linear portions to accommodate a flow of water or another suitable liquid to cool shaping feature 82. Opposing mold sections 56 and 58 likewise are provided with cooling liquid passages.

Mold sections 56, 58 and 60 are formed of any material known and used in the art, which can include aluminum, steel, or other appropriate material. Upper section 100 is preferably formed of stainless steel, as are locking rings 104 and 106. Sections 108 and 114 of the support device preferably are formed of aluminum, while cylinder 110 and piston 112 are formed of stainless steel. Insert 116 preferably is formed of ABS or another suitable thermoplastic.

FIGS. 9-13 illustrate the use of the system to fabricate container 16. While these figures do not depict certain aspects of container formation, for example injection molding and other treatment of preform 50, these aspects are known in the art and not particularly germane to the present invention. In an embodiment, the interior mold surfaces are lubricated before the molding process is started in order to help the molded product to be released from the mold.

FIG. 9 illustrates an initial stage in which opposing mold sections 56 and 58 are brought together and base section 60 is upwardly advanced, thus to close the mold about preform 50. An upper portion of the preform including support ledge 52 and threads 54 (see FIG. 3) remains outside the mold cavity. At this stage preform body 50, having been heated just before its insertion into the mold, has a processing temperature above the glass transition temperature of the thermoplastic. The upper region of preform 50 is supported by its support ledge 52. An expandable part of the preform extends downwardly into the mold cavity.

With the system employing a stretch blow molding process as illustrated in FIG. 10, a stretch rod 65 is extended downwardly from blow nozzle 62 to encounter the bottom of preform 50, and then extended further to axially stretch the preform. Axial elongation continues until the preform encounters the upper surface of shaping feature 82. Specifically, the extended tip of the preform encounters recess 98 in upper surface 84 (FIG. 7), which facilitates an accurate centering of the preform relative to base section 60. The almost fully stretched preform is shown in FIG. 10.

At this stage, air from source 66 is introduced into the preform through blow nozzle 62. Air may be provided at a relatively low pressure for initial expansion (e.g. about 100 psi) followed by a much higher pressure (e.g. about 600 psi) to complete inflation of the preform. Alternatively, the air may be introduced at a single, high pressure (e.g. about 550 psi). In either event, the preform is expanded into contact with the cavity surface, including the cavity surface regions 74 and 118 (as depicted in FIG. 4) of mold sections 56 and 58 and an outer surface 120 of shaping feature 82. This forms a thermoplastic wall 122 that substantially conforms to the cavity surface, as shown in FIG. 11. For purposes of clarity, the thermoplastic wall 122 is depicted with an exaggerated wall thickness in both FIG. 11 and FIG. 12. Due to the circulation of water through mold sections 56, 58 and 60, the thermoplastic wall cools rapidly upon contact with the mold cavity to form a stable expanded container structure.

Figure 12:
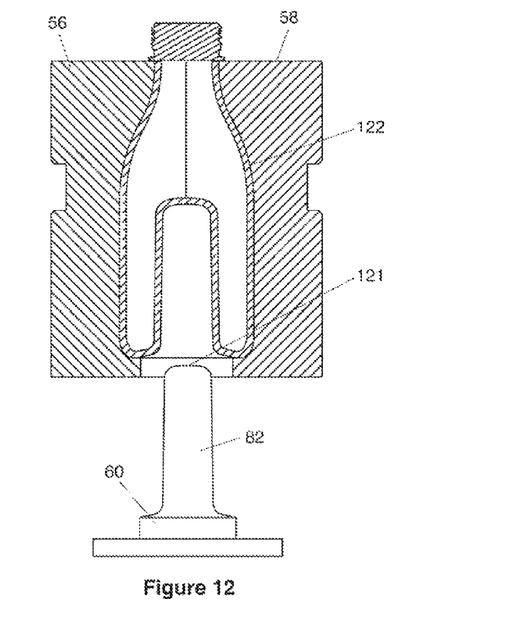
Figure 18:
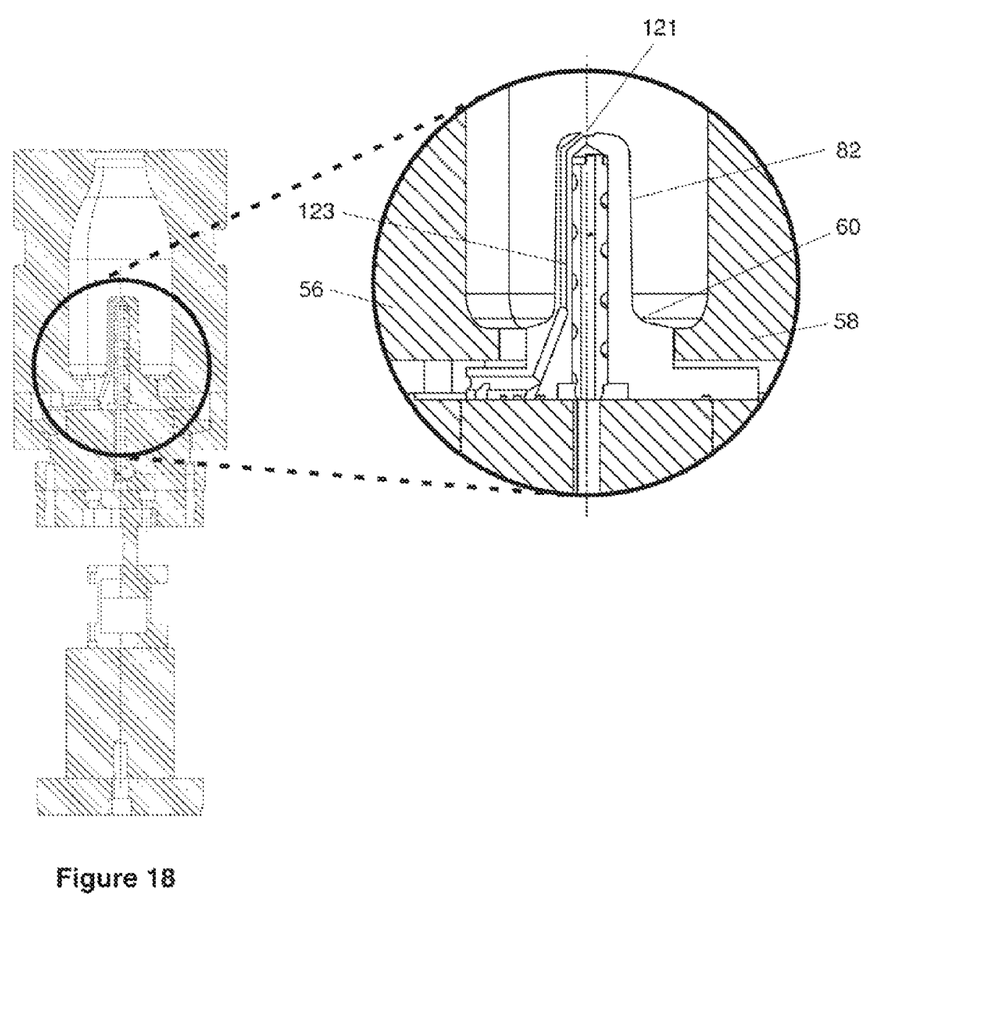
FIG. 18 is a cross-sectional view of the base mold section.

Following expansion formation, the stretch rod 65 is retracted and support device 102 (see FIG. 8) is operated to retract base section 60 relative to mold sections 56 and 58 and the container. Simultaneously, air at a relatively low pressure (e.g. 70 psi) is provided to base section 60 from source 68 (see FIG. 4). The pressurized air exits base section 60 from an opening 121 in the center of the top of the shaping feature 82. The location of the opening 121 is indicated in FIGS. 6, 8 and 12, although the opening itself is not visible in the perspective of these drawings. FIG. 7 also shows the location of the opening 121, though the scale of the drawing does not permit showing the opening itself. A channel in the wall of the shaping feature leads to the opening 121 and is connected to the source 68 of pressurized air. FIG. 18 is a cross-sectional view of the shaping feature 82 that shows the channel 123 and the opening 121. The pressurized air flows through the channels 86-96 to facilitate separation of the shaping feature 82 from the adjacent, surrounding thermoplastic material corresponding to inside wall segment 32 of the finished container. The channel 123 and the channels 86-96 together are a fluid passage of the third or base mold section for conducting a fluid under pressure from outside the mold to an interface between the outer wall of the shaping feature and the expanded container structure.

Figure 13:
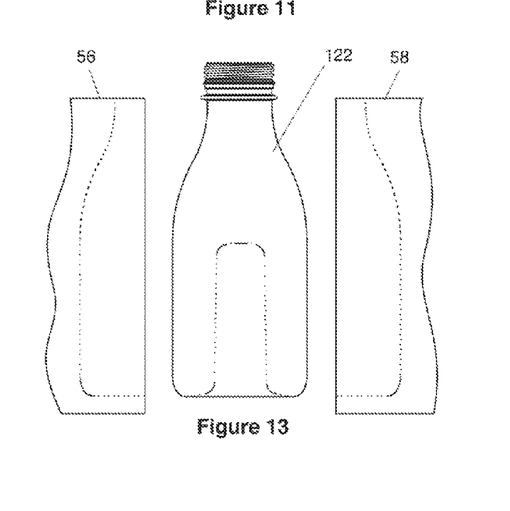

After retraction of the base section, opposing mold sections 56 and 58 are separated from one another to allow removal of the expanded container, as shown in FIG. 13. At this point the container can be extracted from blow nozzle 62. If desired, extraction can be facilitated by providing a low pressure burst of air from air source 66.

Figure 14:
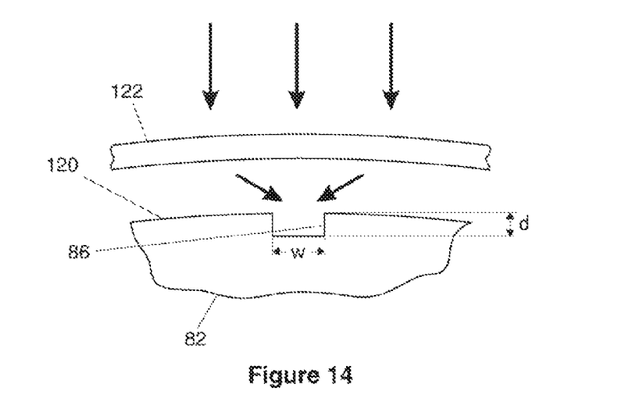
FIGS. 14-16 are schematic views illustrating inflation of the thermoplastic material into contact with a part of the mold cavity wall defined by the base mold section.
Figure 15:
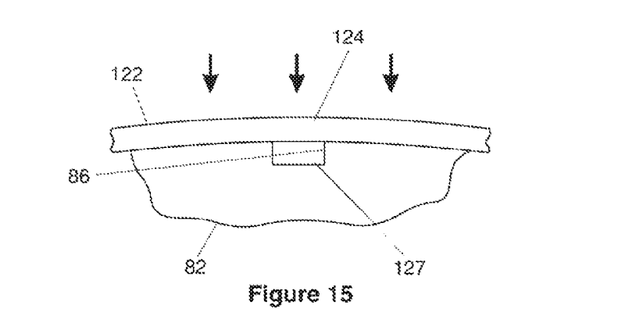
Figure 16:
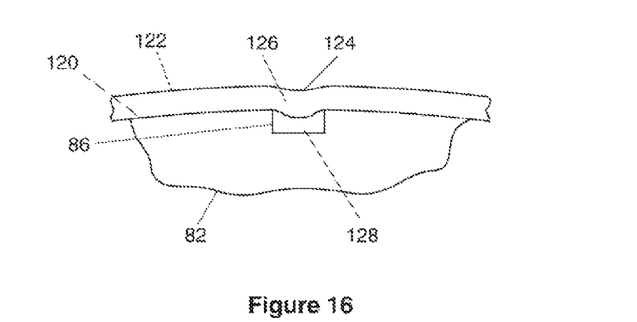

FIGS. 14-16 show the interaction of preform thermoplastic wall 122 with the mold cavity surface, specifically part of shaping feature 82 near channel 86. During preform expansion, the pressurized air provided through the blow nozzle acts against wall 122 to drive it toward the cavity surface, as indicated by the arrows above wall 122. During expansion, air inside the cavity and outside the preform is compressed and evacuated from the cavity. Some of the air inside the cavity and outside of the preform enters the channels and flows out of the mold cavity via the channels and a narrow annular gap between base section 60 and opposing mold sections 56 and 58. In connection with channel 86 in FIG. 14, this is indicated by the arrows below wall 122.

Continued internal pressure drives wall 122 of the preform against the cavity surface as shown in FIG. 15. Conductive cooling of the preform wall begins immediately upon contact with the aluminum mold sections. Nonetheless, wall 122 retains its formable character for a brief time after contact (e.g., about 0.5 seconds), especially along regions 124 aligned with and spanning the channels, where conduction can occur only through wall 122 rather than through the aluminum body of one of the mold sections. During this brief time, wall 122 remains subject to the pressurized air force.

As a result, region 124 of the preform wall undergoes a plastic deformation to form a protrusion 126 that partially enters channel 86, as shown in FIG. 16. Because the wall of the preform tends to have a substantially uniform thickness over the extent of its contact with the mold cavity, and because the pressure inside the preform is substantially uniform throughout the preform interior at any given point in time, the protrusions tend to be uniform along the lengths of the channels, and replicate the pattern formed by the channels to produce ribs 44.

With reference to FIGS. 6, 7 and 16, protrusion 126 represents a partial entry or penetration of the thermoplastic material into channel 86 and the other channels, leaving a substantially open volume 128 adapted for accommodating pressurized air between preform wall 122 and outer surface 120 of the shaping feature. As best seen from FIG. 7, channels 86-96, and accordingly their associated open volumes, are not confined to the axial section of shaping feature 82 but extend along upper surface 84 as well. Thus, pressurized air in the channels exerts a lifting force along substantially the entire outer surface of shaping feature 82 that tends to separate wall 122 from the shaping feature 82 (see FIG. 14). This facilitates its retraction from the expanded preform and mold sections 56 and 58.

Figure 17:
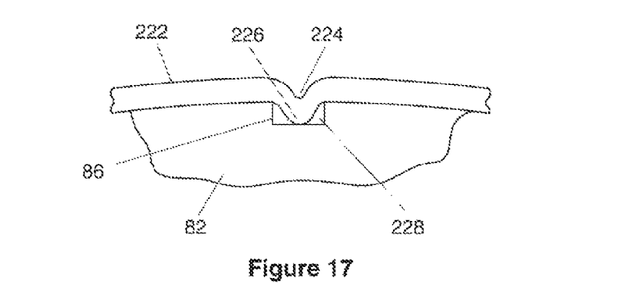
FIG. 17 is a schematic view illustrating an alternative example of inflation of the thermoplastic material into contact with a part of the mold cavity defined by the base mold section.

In one embodiment, illustrated in FIG. 17, a container wall 222 includes a protrusion 226 that enters farther into the channel 86 of mold section 82 than shown in FIG. 16. In this embodiment, the protrusion 226 makes contact with the channel inner surface. An open volume 228 is still present on either side of the protrusion 226 in the embodiment. It is also possible for a protrusion of the container wall to completely fill the channel.

A feature of the invention resides in providing channels 86-96 with a profile suitable for forming ribs 44. As seen in FIG. 14, the transverse profile of channel 86, i.e. the profile transverse to the axial or length direction of the channel is characterized by a circumferential or angular width w and a radial depth d. The width is the more critical dimension. If the channel is too narrow, no discernable protrusion will form during cooling, and result is a smooth, non-ribbed surface of the inside wall section. Conversely, if the channel is too wide, the internal pressure during preform expansion drives wall 122 completely into the channels. In such case, channels 86-96 would fail to provide air passages for use in separating inside wall section 32 from shaping feature 82, rendering the expanded container more difficult or impossible to remove from the mold.

The most suitable channel width w varies in accordance with several factors, including the thermoplastic material involved, the thickness of expanded preform wall 122 as it engages the cavity surface, the preform expansion pressure, and the temperatures of the preform and the mold sections. In fabricating PET containers, a suitable width w has been found to be 0.015 inches or 0.038 centimeter. The width may vary within a range of 0.01 inches to 0.04 inches, or 0.03 centimeter to 0.1 centimeter.

The channel depth d is selected to ensure that protrusion 126 only partially enters the channel, remaining spaced apart from an inner surface 127 of the channel and leaving sufficient open volume to accommodate passage of air or another gas through the channels. The channel depth may vary within a range of 0.001 inches to 0.040 inches, or 0.003 centimeter to 0.1 centimeter, and more preferably is 0.005 inches or 0.01 centimeter. The protrusion amount can vary within a range of 0.001 to 0.005 inches or 0.003 to 0.01 centimeter.

With reference to FIGS. 6 and 7, the symmetrical arrangement of six axially extending channels spaced apart angularly from one another in sixty degree increments has been found effective, both to accommodate pressurized air for separation of the expanded container from the shaping feature, and to provide a suitable arrangement of ribs along inside wall section 32 to enhance the frictional retention of the secondary constituent. Other channel arrangements can be employed, involving more or fewer channels, or an alternative channel direction such as a helical winding about feature 82. A primary consideration is that the surface area of the ribs, in proportion to the total outer surface area of the feature, is sufficient so that air provided at a relatively low pressure exerts a separation force to allow retraction of the feature after the expanded container is cooled.

Thus, the arrangement of channels 86-96 over the shaping feature surface enhances the blow molding process in several respects. During expansion of the preform toward the inside surface of the cavity, the channels assist and guide the flow of air out of the cavity from the region inside the cavity yet outside of the expanding preform. After the fully expanded container has cooled and stabilized, the open volumes remaining in the channels provide passages for pressurized air used to separate the expanded preform from the mold feature. As a result, the mold feature and the resulting inside wall segment of the finished container can be axial, i.e. vertical in an upright container, or tapered.

Finally, the channels are selectively sized to promote formation of radially inwardly extending ribs along the inside wall section that replicate the pattern of the channels in the shaping feature. The ribs provide regions of concentrated retaining force between the inside wall section and a secondary constituent surrounded by the inside wall section, for more effective frictional retention.

While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A process for forming a container with a compartment and an inwardly projecting recess isolated from the compartment, including:
   providing a plurality of mold sections including a selected mold section with an elongate recess shaping feature;
   assembling the mold sections into a mold in which the recess shaping feature projects longitudinally into a mold cavity of the mold, wherein the recess shaping feature has an outer surface and includes at least one channel along the outer surface, the channel having a predetermined channel width and being recessed inwardly from the outer surface to an inner surface of the channel by at least a predetermined channel depth;
   forming an annular gap between the selected mold section and at least one remaining mold section forming the mold, and the at least one channel having an end region in fluid communication with the annular gap;
   mounting a thermoplastic preform to the mold such that an expandable part of the preform projects into the mold cavity;
   with the preform so mounted and with the expandable part heated to a processing temperature above a glass transition temperature of the preform, introducing a fluid under pressure into the preform to cause the expandable part of the preform to undergo a plastic expansion into surface contact with a cavity wall of the mold cavity and with the outer surface of the recess shaping feature to form an expanded container structure;
   cooling the container structure to a temperature below the glass transition temperature to solidify the container structure;
   after cooling the container structure, supplying a fluid under pressure via the at least one channel to an interface between the container and the shaping feature while simultaneously moving the selected mold section longitudinally relative to the container structure to separate the shaping feature from the container structure; and
   removing the container structure from the mold cavity.

2. The process of claim 1 wherein:
   providing the mold sections includes selecting a channel width such that said portions of the container structure are caused to protrude inwardly into the channel during said plastic expansion.

3. The process of claim 1 wherein:
   the at least one channel comprises a plurality of the channels spaced apart angularly from one another and having end regions in fluid communication with the annular gap.

4. The process of claim 1 wherein:
   mounting the thermoplastic preform comprises aligning the expandable part of the preform to project longitudinally into the mold cavity towards the shaping feature.

5. The process of claim 4 further including:
   with the thermoplastic preform so mounted and with the expandable part of the preform so heated, and before introducing the fluid under pressure, plastically elongating said expandable part in the longitudinal direction.

6. The process of claim 5 wherein:
   plastically elongating the expandable part comprises using a stretch rod to stretch the expandable part into end-to-end contact with the shaping feature.

7. The method of claim 1, wherein during the step of introducing a fluid under pressure, portions of the container structure span the at least one channel and thereby remain spaced apart from the inner surface of the channel.

8. The process of claim 1 wherein the thermoplastic preform comprises a material selected from the following: polyester, polyethylene terephthalate, polyethylene, high density polyethylene, polypropylene, polyethylene napthalate and polylactic acid.

9. The process of claim 1, wherein introducing a fluid under pressure into the preform further comprises allowing air to escape through the at least one channel.

10. The process of claim 1, wherein the thermoplastic preform is polyethylene terephthalate.

11. A process for forming a container with a compartment and an inwardly projecting recess isolated from the compartment, including:
    providing a plurality of mold sections including a selected mold section with an elongate recess shaping feature;
    assembling the mold sections into a mold in which the recess shaping feature projects longitudinally into a mold cavity of the mold, wherein the recess shaping feature has an outer surface and includes at least one channel along the outer surface, the channel having a predetermined channel width and being recessed inwardly from the outer surface to an inner surface of the channel by at least a predetermined channel depth;
    mounting a thermoplastic preform to the mold such that an expandable part of the preform projects into the mold cavity;
    with the preform so mounted and with the expandable part heated to a processing temperature above a glass transition temperature of the preform, introducing a fluid under pressure into the preform to cause the expandable part of the preform to undergo a plastic expansion into surface contact with a cavity wall of the mold cavity and with the outer surface of the recess shaping feature to form an expanded container structure, and further cause portions of the container structure to span the at least one channel to define an open volume within the channel;
    cooling the container structure to a temperature below the glass transition temperature to solidify the container structure;
    after cooling the container structure, supplying a fluid under pressure via the at least one channel to an interface between the container and the shaping feature while simultaneously moving the selected mold section longitudinally relative to the container structure to separate the shaping feature from the container structure; and
    removing the container structure from the mold cavity.

12. The process of claim 11, wherein introducing a fluid under pressure into the preform further comprises allowing air to escape through the at least one channel.

13. The process of claim 11, wherein the thermoplastic preform is polyethylene terephthalate.

* * * * *